Patented Sept. 14, 1948

2,449,470

UNITED STATES PATENT OFFICE 2,449,470

SYNTHESIS OF ORGANIC OXYGEN-CONTAINING COMPOUNDS

William F. Gresham and Richard E. Brooks, Wilmington, Del., assignors to E. I. du Pont de Nemours & Company, Wilmington, Del., a corporation of Delaware No Drawing. Application June 28, 1946, Serial No. 680,072

7 Claims. (Cl. 260—615)

This invention relates to the synthesis of organic oxygen-containing compounds, and more particularly to the synthesis of 1,1,2-trialkoxyethanes by simultaneous reaction between dialkyl formals, carbon monoxide, and hydrogen in the presence of an alkanol.

An object of this invention is to provide a method for preparing 1,1,2-trialkoxyethanes from relatively inexpensive and readily available starting materials. Other objects of the invention will appear hereinafter.

In our copending application S. N. 590,960 filed April 28, 1945 it is disclosed that polyhydroxy compounds can be prepared by reaction between formaldehyde, carbon monoxide, and hydrogen in the presence of hydrogenation catalysts, preferably at elevated temperatures under pressures in excess of 100 atmospheres. It is also disclosed in that application that a corresponding reaction takes place when reactive formals are substituted for the formaldehyde reactant. This application is a continuation-in-part of the said copending application, S. N. 590,960.

It has been discovered in accordance with this invention that 1,1,2-trialkoxyethanes are produced by reaction between dialkyl formals, carbon monoxide, and hydrogen in the presence of an alkanol and a catalyst comprising as the essential component an element of the class consisting of nickel and cobalt, it being understood that these elements may be present in free or combined form.

The nickel-containing and cobalt-containing catalysts which may be employed in the practice of the invention include metallic nickel, metallic cobalt, nickel carbonyl, cobalt carbonyl, nickel oxides, cobalt oxides, nickel salts of organic or inorganic acids, cobalt salts of organic or inorganic acids, combinations of these materials with each other or with inert supports such as kieselguhr, pumice, silica, etc., or promoters such as Cu, $ThO_2$, Mn, Cr, Mg, etc. The amount of Ni or Co catalyst is generally about 0.1% to 20% based on the total weight of the reaction mixture, although much smaller quantities are found to be somewhat effective. Hydrogenation catalysts other than Ni-containing or Co-containing catalysts are relatively less effective in the practice of the invention, although the following catalysts are found to be effective to a certain extent: copper-chromium-silica, copper-silica, copper-silica-magnesia, and the like.

Any of the dialkyl formals may be employed as reactants in the practice of the invention. Excellent results are obtained with the lower dialkyl formals such as methylal. Likewise, any of the alkanols may be employed the lower alkanols such as methanol being preferred. The initial molal ratio of dialkyl formal:alkanol is not highly critical but should preferably be within the range of about 2:1 to 1:20.

The reaction is preferably conducted by heating a mixture of dialkyl formal, carbon monoxide, and hydrogen in a suitable pressure-resistant vessel in the presence of one of the aforesaid catalysts. In certain embodiments, the initial molal ratio of $CO:H_2$ is preferably within the range of 3:1 to 1:3. In general, superatmospheric pressures are employed, usually pressures of at least 10 atmospheres. Optimum results are obtained at pressures within the range of 400 to 1000 atmospheres. The maximum pressure is determined by the strength of the retaining vessel and may be as high as 3000 atmospheres or higher. The reaction temperature is usually within the range of 100° to 350° C., preferably about 125 to 170° C.

In one method of practicing the invention, methylal and methanol are placed in a pressure-resistant vessel along with the catalyst, and a mixture of carbon monoxide and hydrogen is thereafter injected under very high pressure. The temperature of the mixture is controlled by suitable devices, and is maintained within the range set forth above. After the reaction is complete, the resulting product is removed from the reaction vessel and the 1,1,2-trimethoxyethane produced by the reaction is separated from the mixture by any suitable method, such as by fractional distillation.

The invention is illustrated further by means of the following examples.

*Example 1.*—A mixture containing 38.1 grams of methylal, 160 grams of methanol, and 20 grams of reduced sintered cobalt oxide catalyst was placed in a silver-lined shaker tube and a mixture of carbon monoxide and hydrogen (molal ratio 1:1) was injected into the tube under pressure of 550 to 750 atmospheres. This reaction mixture was shaken for 15 minutes at a temperature of 160° to 170° C. with intermittent injection of the carbon monoxide:hydrogen mixture to maintain pressures of at least about 600 atmospheres. The resulting mixture was withdrawn from the reaction vessel and was fractionally distilled. After removal of the unconverted methylal (about 50%) and methanol (about 88%) by distillation, 25 cc. of distilled water was added to the residue and 1,1,2-trimethoxyethane was distilled therefrom as a homogeneous water azeotrope boiling at 93° to 94° C. Composition of the azeotrope is about 30% water—70% 1,1,2-trimethoxyethane. Saturation of the azeotrope with potassium carbonate resulted in an upper layer of 30 grams, which when dried over sodium sulfate and redistilled boiled at 56° to 59° C. at a pressure of 56 mm. Boiling point at atmospheric pressure is 126°–127.5° C. and refractive index at 25° is 1.3901.

Example 2.—Example 1 was repeated using isobutanol as the alkanol in place of methanol. The resulting product was a mixture of 1,1,2-trialkoxyethanes, which contained 1,1-dibutoxy-2-methoxyethane, and 1,1,2-tributoxyethane.

Example 3.—A mixture of 83.2 grams (0.8 mol.) of ethylal (diethoxymethane), 92 grams of absolute ethanol and 20 grams of reduced fused cobalt catalyst in a shaker tube (silver-lined) under 700 atmospheres pressure of a gas mixture composed of two parts carbon monoxide and one part hydrogen (by volume) was heated at 200° to 214° C. for 30 minutes. The products were cooled and then distilled, giving 6.0 grams of ethoxyethanol, (B. P. 53° to 56° C. at 30 mm.) and 7.5 grams of 1,1,2-triethoxyethane (B. P., 73° to 75° C., at 30 mm.).

The above examples are illustrative only and are not intended to limit the invention. While in the examples the invention is illustrated by means of a batchwise operation, it is to be understood that the invention may also be practiced in a continuous manner. It is generally preferred to employ nickel or cobalt catalysts which are either in a finely divided dispersed form, or which are soluble in the reaction mixture; however, a fixed bed catalyst may be employed if desired.

The products obtained in accordance with this invention are widely useful as solvents and intermediates for the manufacture of unsaturated ethers, etc.

Since many embodiments of the invention may be made without departing from the spirit and scope thereof it will be understood that we do not limit ourselves except as set forth in the following claims.

We claim:

1. The process for the synthesis of 1,1,2-trialkoxyethanes which comprises heating a dialkyl formal with carbon monoxide and hydrogen in the presence of an alkanol at a temperature within the range of 100° to 350° C. under a pressure of at least 10 atmospheres in the presence of a catalyst comprising a member of the class consisting of nickel and cobalt, and thereafter separating from the resulting reaction product the 1,1,2-trialkoxyethane produced by the said reaction.

2. The process for the synthesis of 1,1,2-trialkoxyethanes which comprises heating a dialkyl formal with carbon monoxide and hydrogen in the presence of an alkanol at a temperature within the range of 100° to 350° C. under a pressure of 400 to 1000 atmospheres in the presence of a catalyst comprising a member of the class consisting of nickel and cobalt, and thereafter separating from the resulting reaction product the 1,1,2-trialkoxyethane produced by the said reaction.

3. The process for the synthesis of 1,1,2-trimethoxyethane which comprises heating methylal with carbon monoxide and hydrogen in the presence of methanol at a temperature within the range of 100° to 350° C. under a pressure of 400 to 1000 atmospheres in the presence of a cobalt-containing catalyst as the essential ingredient and thereafter separating 1,1,2-trimethoxyethane from the resultant reaction product.

4. A process for the synthesis of 1,1,2-trimethoxyethane which comprises heating methylal with carbon monoxide and hydrogen in the presence of methanol at a temperature within the range of 100° to 350° C. under a pressure of 400 to 1000 atmospheres in the presence of a catalyst containing 0.1 to 20% of cobalt based on the total weight of the reaction mixture, and thereafter separating 1,1,2-trimethoxyethane from the resultant reaction product.

5. A process set forth in claim 4 in which the initial molal ratio of $CO:H_2$ is within the range of 3:1 to 1:3.

6. A process for the synthesis of 1,1,2-triethoxyethane and ethoxyethanol which comprises heating diethoxymethane with carbon monoxide and hydrogen in the presence of ethanol at a temperature within the range of 100° to 350° C. under a pressure of 400 to 1000 atmospheres in the presence of a cobalt-containing catalyst, whereby a mixture containing 1,1,2-triethoxyethane and ethoxyethanol is produced and thereafter separating 1,1,2 - triethoxyethane and ethoxyethanol from the resulting mixture.

7. A process for the synthesis of 1,1,2-trialkoxyethanes which comprises heating methylal with carbon monoxide and hydrogen in the presence of isobutanol at a temperature within the range of 100° to 350° C. under a pressure of 400 to 1000 atmospheres, in the presence of a cobalt-containing catalyst whereby a mixture containing 1,1-dibutoxy-2-methoxyethane and 1,1,2-tributoxyethane is produced.

WILLIAM F. GRESHAM.
RICHARD E. BROOKS.

REFERENCES CITED

The following references are of record in the file of this patent:

UNITED STATES PATENTS

| Number | Name | Date |
|---|---|---|
| 1,460,244 | Heineman | June 26, 1923 |
| 1,864,643 | Dreyfus et al. | June 28, 1932 |
| 1,963,119 | Dreyfus | June 19, 1934 |

FOREIGN PATENTS

| Number | Country | Date |
|---|---|---|
| 396,658 | Germany | Aug. 10, 1933 |